Nov. 20, 1962 W. WILLIS 3,064,710
METHOD OF MAKING TUBES OF TRUNCATED-WEDGE-CROSS-SECTION
Filed March 28, 1958 3 Sheets-Sheet 1
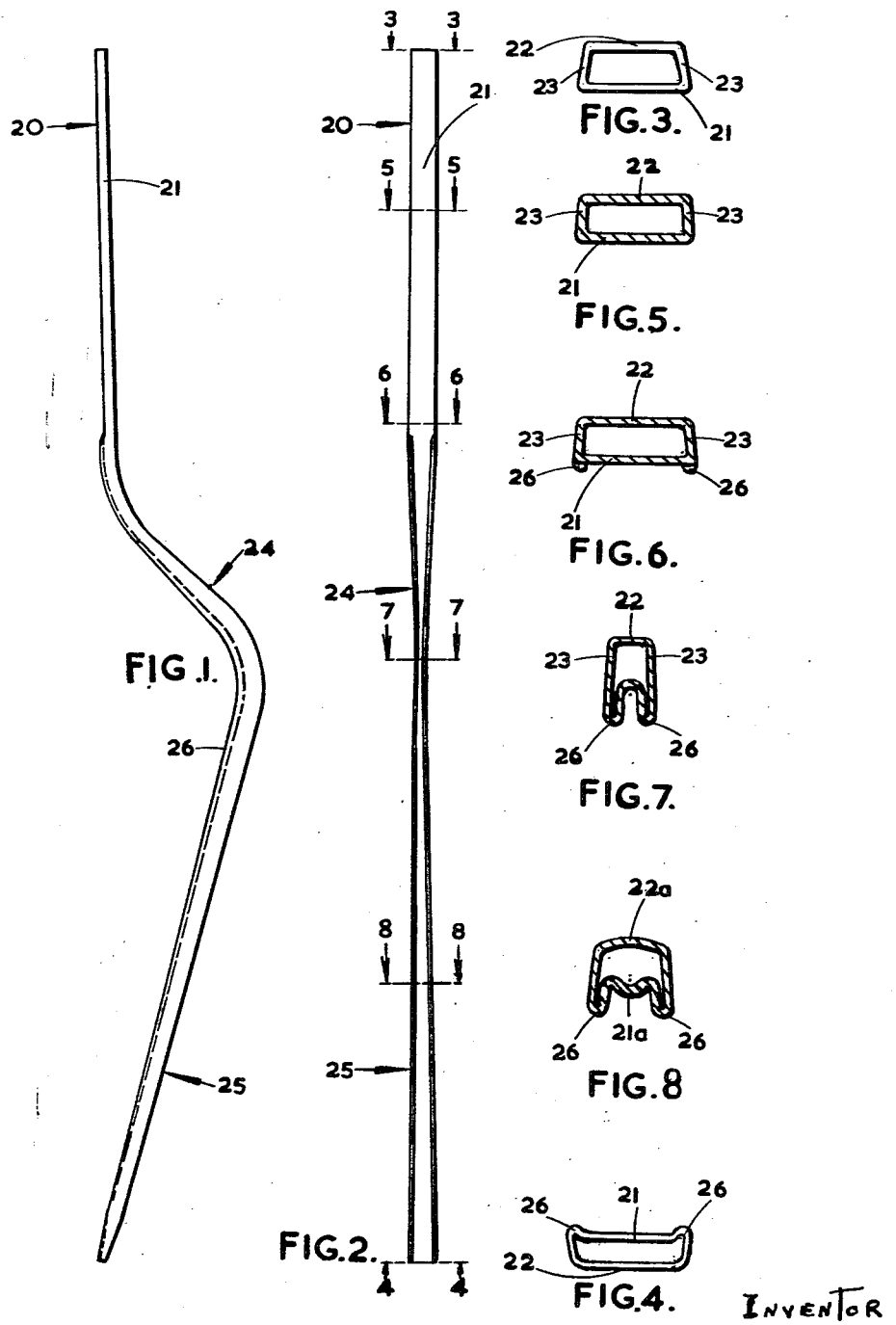

Nov. 20, 1962 W. WILLIS 3,064,710
METHOD OF MAKING TUBES OF TRUNCATED-WEDGE-CROSS-SECTION
Filed March 28, 1958 3 Sheets-Sheet 3

INVENTOR
WiLLiam WiLLis
By
Mawhinney + Mawhinney
ATTORNEYS

United States Patent Office 3,064,710
Patented Nov. 20, 1962

3,064,710
METHOD OF MAKING TUBES OF TRUNCATED-WEDGE-CROSS-SECTION
William Willis, Coventry, England, assignor, by mesne assignments, to Bristol Siddeley Engines Limited, Bristol, England, a company of Great Britain
Filed Mar. 28, 1958, Ser. No. 724,740
Claims priority, application Great Britain Apr. 4, 1957
5 Claims. (Cl. 153—34)

The invention relates to a method of, and apparatus for making tubes, of truncated-wedge-cross-section, which are to be arranged side by side and held together to form a hollow body of which the cross-section is a regular figure at any position along its axis, and has particular reference to the making of tubes for building such a body in the case where the cross-section of the latter varies smoothly between different axial positions (e.g., a rocket motor), the tubes being directed longitudinally of the body and intended for a circulation of coolant. The object of the invention is to enable such tubes to be made in a simple manner and such that the inclined side walls of the wedge-sectioned tubes will engage flatly with those of their neighbours regardless of the changes in cross-section at different axial positions of the body.

The method of the invention includes the steps of starting with each tube being of circular cross-section and subjecting the tube simultaneously to compression in two intersecting directions to distort the circular cross-section into the desired truncated-wedge-cross-section while supporting its inner surface by an extrudable material of which the extrusion rate is controlled to be in sympathy with the rate at which the internal volume of the tube is changed during the pressing operation.

In the case where the cross-section of the body is to vary smoothly between different axial positions, the method also includes the preliminary step of bending each tube, while of circular cross-section, lengthwise substantially to conform with the contour, in a longitudinal section, of the body wall.

According to a further feature the method includes the initial step of reducing the inner and outer diameters of the tubes to produce a progressive reduction of the bore in a desired position, preferably without significant change of wall thickness.

According to an alternative further feature the method involves arranging for the compression to produce a progressive reduction of the bore in a desired position, and for the surplus metal thus displaced to form fins, in continuation of the inclined side walls, at that side of the tube which will be outermost when the tube is in its assembled position.

Apparatus according to the invention, and for effecting the change of cross-section of a tube of circular cross-section (which may have previously been bent lengthwise to make it conform substantially to the contour, in a longitudinal section, of the hollow body wall), includes a channel-shaped die of which the lateral side walls are formed separately and are arranged to be urged towards each other, against a bias, by the operative stroke of a coacting punch, the face of the bottom wall of the die and the leading end of the punch being for controlling the formation of the ends of the cross-section, and the adjacent faces of the lateral side walls of the die defining the desired wedge angle for controlling the formation of the inclined side walls of the wedge cross-section.

One embodiment of the invention is illustrated by way of example in the accompanying drawings, in which:

FIGURE 1 is a side view of one of the tubes formed by the method and apparatus;

FIGURE 2 is a plan view, from the left-hand side of FIGURE 1, of the tube;

FIGURE 3 is an end view to an enlarged scale, on the line 3—3 of FIGURE 2;

FIGURE 4 is an opposite end view, to the same enlarged scale, on the line 4—4 of FIGURE 2;

Figure 9:
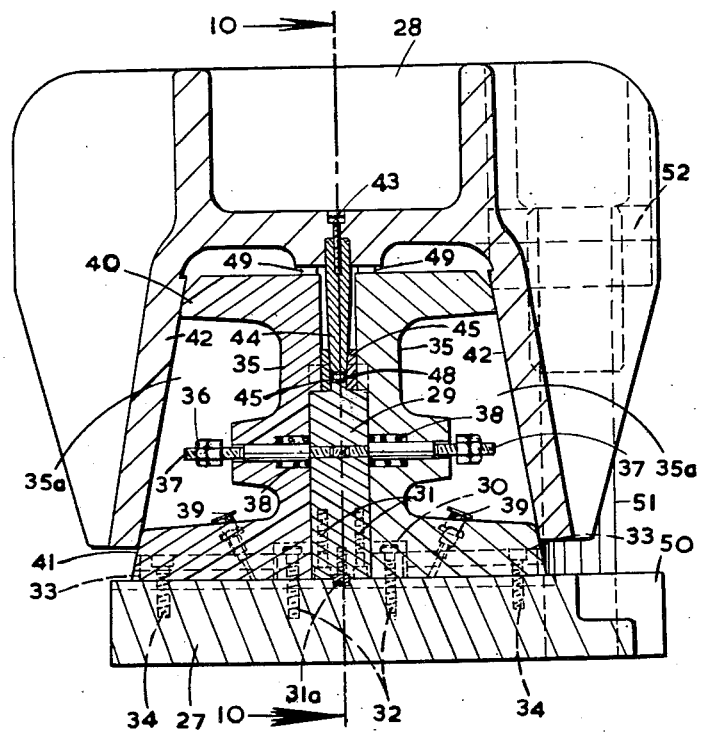
Figure 11:
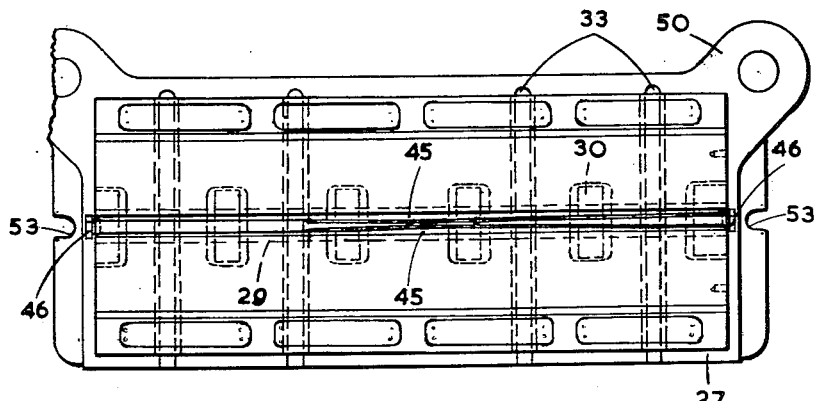
Figure 10:
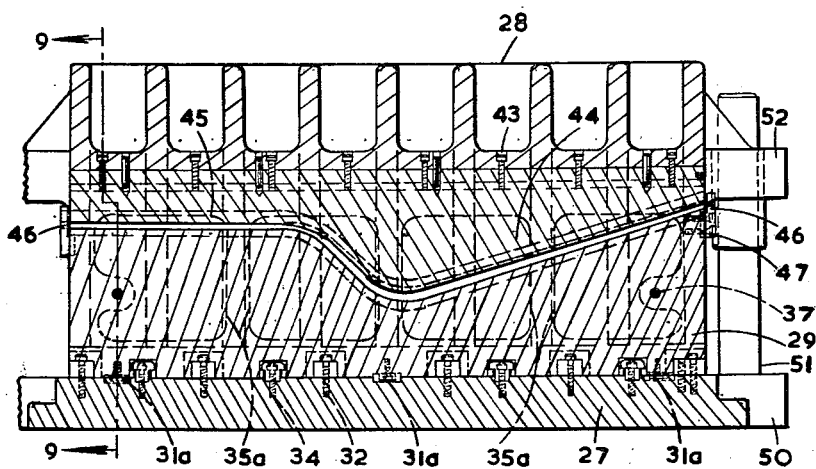

FIGURES 5 to 8, inclusive, are cross-sectional views, to the same enlarged scale, taken respectively on the lines 5—5, 6—6, 7—7 and 8—8 of FIGURE 2;

FIGURE 9 is a cross-section to a reduced scale, taken on the line 9—9 of FIGURE 10, through apparatus for forming the tube of FIGURES 1 to 8;

FIGURE 10 is a longitudinal section of the apparatus taken on the line 10—10 of FIGURE 9; and FIGURE 11 is a plan view, with a top portion removed, of the apparatus, and drawn to the same scale as FIGURE 10.

Referring first to FIGURES 1 to 8, the tube formed by the method and apparatus has a straight end portion 20 of four-sided uniform cross-section, the wall 21 being wider than the opposite wall 22, and the walls 23, 23 connecting them including a constant angle between them.

A plurality of these tubes are to be arranged in a circle, with their walls 21 outermost and their walls 23, 23 flatly contacting each other so as to form part of a rocket motor, of which latter a cylindrical portion will be formed by the end portions 20 of the tubes, a throat portion by the central portions 24 of the tubes, and a divergent nozzle portion by the opposite end portions 25 of the tubes. It will therefore be seen that the diameter of the rocket motor will progressively diminish from the zone formed by the tube portions 20 to the remote end of the zone formed by the tube portions 24, and will progressively increase from the last-mentioned zone to the outer end of the nozzle formed by the tube portions 25.

It will be apparent, therefore, that the widths of the inner and outer walls of the tubes must vary in sympathy with the variations in diameter at different axial positions of the rocket motor to be formed by the circle of tubes. Thus, the tube portion 24 diminishes in width (see FIGURES 2, 6 and 7) but increases in depth (see FIGURES 1, 6 and 7) as one proceeds from the portion 20 towards the portion 25, and the portion 25 increases in width (see FIGURES 2, 7 and 8) but decreases in depth (see FIGURES 1, 7 and 8) as one proceeds from the portion 24 to the outer end of portion 25.

It will also be seen that the spacing of the walls 23, 23 of each tube is determined by the geometry of the rocket motor, and that if the cross-sectional area of the tubes is to vary (e.g., for providing an accelerated flow of coolant through the portions 24, which correspond to the hottest zone of the rocket motor) the spacing between the walls 21 and 22 of each tube can be varied.

By the method and apparatus presently to be described the tube, as shown in FIGURES 1 to 8, is provided, where it narrows, with fins 26, 26 formed by folds in the tube, which are continuations of the walls 23, 23 and extend beyond the outer wall 21. These fins not only influence the cross-sectional area of the bore of the tube but stiffen the tubes, in the radial direction of the rocket motor, and provide a ready means for welding the adjacent tubes together in a manner to effect a seal between the flatly contacting walls 23, 23 of adjacent tubes.

The tube can be further stiffened, particularly for dealing with any peak pressure which may exist in its bore during subsequent use, by providing its walls 21 and 22 with a convex curvature as indicated at 21a and 22a in FIGURE 8.

After a plurality of the tubes have been assembled to form the rocket motor, and have had their adjacent edges welded together, the assembly is externally reinforced by wire wound helically under tension, or by steel hoops.

The tube is given the above-mentioned cross-sectional shape by the apparatus illustrated in FIGURES 9 to 11. This apparatus includes a bed plate 27, which is to be suitably secured to the table of a press (not shown), and a head 28 which is to be carried by the movable member of the press. A longitudinally-extending bottom die 29 has transverse slots, at intervals along its length, in which are transverse mounting plates 30 held to the bottom die by screws 31. The extending ends of these mounting plates are secured to the bed plate 27 by screws 32. In this way the bottom die is located firmly in position on the bed plate. One of a line of screws for initially centralising the bottom die is shown at 31a.

Intermediate the mounting plates 30, the bottom die has other transverse recesses to accommodate T-shaped ways 33 which are made fast with the bed plate by screws 34, 34.

At each lateral side of the bottom die is a block 35 which is guided by the adjacent ways 33 for movement towards and away from the lateral sides of the bottom die 29, each block being outwardly located by nuts and locknuts 36 on studs 37 engaged in the bottom die, and each block being recessed to contain a spring 38 for urging it to its outermost position. Means for supplying lubricant to the ways are shown at 39 in FIGURE 9.

The remote walls of the blocks 35 are provided with top and bottom flanges 40, 41, respectively, which are interconnected by webs 35a so as to define recesses for accommodating the outer ends of the studs 37, and the outer edges of these flanges and webs are formed to be downwardly divergent for coaction with downwardly divergent surfaces 42, 42 of the head 28, which latter supports, as by a line of screws 43, a punch 44 for coaction with the bottom die 29.

The adjacent faces of the punch and bottom die have a configuration, as will be seen from FIGURES 10 and 11, such as will apply the desired cross-sectional depth (i.e., the distance between the walls 21 and 22) to the tube in different axial positions. The tube to be treated is initially of circular cross-section and bent lengthwise substantially to conform with the contour, in a longitudinal section, of the rocket motor of which it is to form part, and the tube is then placed in position in the apparatus. The arrangement of the apparatus is such that as the head 28 descends and urges the punch 44 towards the bottom die 29, the blocks 35 are forced inwardly towards each other by the wedging action of the downwardly divergent surfaces 40, 41, 42 acting in opposition to the springs 38. This causes the blocks to grip, and compress the tube laterally to form its side walls 23, while the punch and bottom die simultaneously compress the tube, in a direction substantially at right angles to the line of action of the blocks, to form its walls 21 and 22.

The blocks 35 are conveniently provided with wear strips 45, arranged at the included angle of the tube side walls 23, in the position in which they act upon the tube, and by providing lateral clearance between these wear strips and the punch 44 in appropriate positions along their lengths, spaces are provided into which metal of the tube will be forced to form the fins 26 on the tube. It will be seen from FIGURE 11 that the adjacent surfaces of the two wear strips are profiled for varying the width of the final tube (i.e., the spacing of the walls 23, 23) in different positions along its length. It will also be seen from FIGURES 10 and 11 that, at each end of the apparatus is a rest 46 which is secured by screws 47 to the adjacent end of the bottom die 29. These rests have recesses in their upper surfaces for supporting the ends of the tube, when it is initially of circular cross-section and bent longitudinally, holding the longitudinally bent intermediate portion of the tube correctly positioned relatively to the pressing surfaces in readiness for the pressing operation.

It is particularly important to prevent the tube being pressed from collapsing, and for this purpose it is previously filled with an extrudable material; and it is equally important that this material shall be able to be extruded from the open ends of the tube so as to prevent the latter from bursting during the pressing operation. It has been found in practice that a wax composed of a paraffin wax and additives, so as to have a melting point of the order of 110 to 115 deg. F., is satisfactory; and by arranging for the punch and bottom die to act on unwanted extremities, of the tubes, which can afterwards be cut off, to be of appropriate cross-section a desirable control over the rate of extrusion of the material can be obtained.

The operative surface of the bottom die will, of course, be made of channel-form in those positions in which the wall 21 of the tube is to be curved as at 21a in FIGURE 8.

FIGURE 9 shows the parts in their relative positions at the end of a pressing operation, a cross-section of the finished tube, substantially corresponding to that of FIGURE 6, being shown at 48. At the end of this operation, the head 28 rises and this enables the springs 38 to separate the blocks 35, whereafter the finished tube can be lifted out by the unwanted end portions lying in the recesses in the rests 46.

For setting up the machine, use can be made of packing pieces 49 between the head and the top surfaces of the blocks for limiting the downward stroke of the punch 44 and, incidentally, the inward movement of the blocks; and for a like purpose the wear strips 45 would be selected to be of the desired dimensions and operative-surface contour.

At one lateral side the bed plate 27 has corner lugs 50 in which are supported guide posts 51 working in similar lugs 52 of the head 28, and the bed plate has end recesses 53 (see FIGURE 11) for enabling it to be bolted to the press.

Obviously, by choosing appropriate contours for the working faces of the punch, the bottom die and the wear strips, or for one or some of them, the cross-sectional shape of the tube can be varied, either throughout its length or in any particular position. Thus, for example, by relieving the surface of the top punch in a selected axial position, the distance between the walls 21 and 22 can be slightly increased in that position whereby to enable the bends between the outer wall 21 and the side walls 23, 23, and between the wall 22 and the said side walls, to be made less sharp.

What I claim as my invention and desire to secure by Letters Patent of the United States is:

1. Apparatus for converting tubes of circular cross-section into tubes of truncated-wedge-cross-section which are to be arranged side-by-side and held together to form a hollow body of which the cross-section is a regular figure at any position along its axis, comprising a channel-shaped die having a fixed bottom wall, said die having separate portions defining lateral side walls of the channel, means supporting said separate portions for relative movement towards and away from each other, means biasing said separate portions away from each other, a coacting punch, said punch and lateral side walls having cooperating parts for urging said separate portions towards each other during the operative stroke of the punch, the face of the bottom wall of the die and the leading end of the punch having cooperating contoured parts for controlling the formation of the end walls of the cross-section, and the adjacent faces of the lateral side walls of the die cooperating with other adjacent parts of the punch for defining the desired wedge angle for controlling the formation of the inclined side walls of the wedge cross-section, said cooperating parts of the punch and faces of said side walls actively cooperating at all times during the operative stroke of the punch.

2. Apparatus as claimed in claim 1, wherein said die and punch engage the exterior surfaces only of the tube.

3. Appartus as claimed in claim 1, wherein a filler is introduced into the interior of the tube before subjecting the tube to the compression action of the die and punch to prevent collapsing of the tube during the compression action of the die and punch.

4. Apparatus as claimed in claim 1, wherein the contours of said face of the bottom wall and the leading end of the punch cooperate to correct any inaccuracy imparted to the tube by lengthwise bending of the tube before insertion into the apparatus.

5. Apparatus as claimed in claim 1, wherein said adjacent faces of the lateral side walls of the die are configured throughout their length for varying the width of the tube at different positions along the length of the tube so that the side walls of an assembly of said tubes, for forming the hollow body, will be in contact with the side walls of adjacent tubes regardless of the changes of cross-sectional area of the body in different axial positions.

References Cited in the file of this patent

UNITED STATES PATENTS

| | | |
|---|---|---|
| 1,474,882 | Baumgarten | Nov. 20, 1923 |
| 1,700,751 | Vincent | Feb. 5, 1929 |
| 1,924,340 | Whitehouse | Aug. 29, 1933 |
| 1,950,726 | Graybill | Mar. 13, 1934 |
| 2,001,643 | Wilcox | May 14, 1935 |
| 2,357,605 | Nivison | Sept. 5, 1944 |
| 2,448,179 | Gruetjen | Aug. 31, 1948 |
| 2,780,000 | Huet | Feb. 5, 1957 |
| 2,849,788 | Creek | Sept. 2, 1958 |
| 2,887,142 | Emmons | May 19, 1959 |

FOREIGN PATENTS

| | | |
|---|---|---|
| 444,480 | Germany | May 21, 1947 |